United States Patent
Rozen et al.

(10) Patent No.: US 8,559,365 B2
(45) Date of Patent: Oct. 15, 2013

(54) AFTER TRANSMISSION RETURN SIGNAL

(75) Inventors: Ilan Rozen, Hod HaSharon (IL); Ran Kern, Ramat HaSharon (IL); Reuven Franco, Tel Aviv (IL); Aharona Lurie, Or Yehuda (IL)

(73) Assignee: CopperGate Communications Ltd., Tel Aviv (IL)

( * ) Notice: Subject to any disclaimer, the term of this patent is extended or adjusted under 35 U.S.C. 154(b) by 329 days.

(21) Appl. No.: 12/245,859

(22) Filed: Oct. 6, 2008

(65) Prior Publication Data

US 2009/0109971 A1    Apr. 30, 2009

Related U.S. Application Data

(60) Provisional application No. 60/983,615, filed on Oct. 30, 2007, provisional application No. 60/989,658, filed on Nov. 21, 2007.

(51) Int. Cl.
*H04W 4/00* (2009.01)
*H04L 12/28* (2006.01)
*H04J 3/16* (2006.01)

(52) U.S. Cl.
USPC ............ 370/328; 370/331; 370/389; 370/468

(58) Field of Classification Search
USPC .................... 370/329, 338, 389–392
See application file for complete search history.

(56) References Cited

U.S. PATENT DOCUMENTS

| | | | |
|---|---|---|---|
| 4,287,592 A * | 9/1981 | Paulish et al. | 370/403 |
| 6,256,478 B1 * | 7/2001 | Allen et al. | 455/63.1 |
| 2003/0103521 A1 * | 6/2003 | Raphaeli et al. | 370/445 |
| 2005/0078678 A1 * | 4/2005 | Kim et al. | 370/390 |
| 2006/0030323 A1 * | 2/2006 | Ode et al. | 455/436 |
| 2006/0195629 A1 * | 8/2006 | Sharma et al. | 710/30 |
| 2006/0256740 A1 * | 11/2006 | Koski | 370/278 |
| 2010/0177713 A1 * | 7/2010 | Yoshii et al. | 370/329 |

* cited by examiner

*Primary Examiner* — Brandon Renner
(74) *Attorney, Agent, or Firm* — Daniel J. Swirsky; AlphaPatent Associates Ltd.

(57) ABSTRACT

A method includes transmitting a next transmission after an inter-frame period after a previous transmission, wherein the inter-frame period is long enough to allow a return signal responding to the previous transmission. A network device includes a receiver to receive a transmission from a source device and a transmitter at least to transmit a return signal to the source device indicating successful receipt or lack thereof of the transmission during a return period forming part of an inter-frame period after the transmission.

36 Claims, 3 Drawing Sheets

AFTER TRANSMISSION RETURN SIGNAL

CROSS-REFERENCE TO RELATED APPLICATIONS

This application claims benefit from U.S. Provisional Patent Applications No. 60/983,615, filed Oct. 30, 2007 and 60/989,658, filed Nov. 21, 2007, which are hereby incorporated in their entirety by reference.

FIELD OF THE INVENTION

The present invention relates to data networks in general and to transmission receipt in such networks in particular.

BACKGROUND OF THE INVENTION

Data networks are ubiquitous. They are utilized to transfer information from one location to the next and they do so through network protocols. One common protocol is the TCP/IP protocol, which adds headers and footers carrying transmission information to packets of "payload" data. When a packet is transmitted, it is saved for a period of time, in case the packet was not properly received and needs to be retransmitted. There may be a transmission queue, with the packets waiting for transmission, and a separate "after transmission" queue, holding already transmitted packets for possible retransmission. Depending on the latency in the current network, the after transmission queue can be quite large.

The TCP/IP and other protocols include a back channel through which retransmission requests and other information are sent. One common back channel transmission is an ACK (acknowledgement) packet which is a back channel packet indicating that a particular packet has been successfully received. When an ACK packet is received, the packet to which it refers is removed from the after transmission queue.

Some protocols use a NACK (Negative acknowledgment) packet, sent only when a packet is not properly received, rather than an ACK packet. This significantly reduces the number of back transmissions, since most packets are received and only a few are missed.

The ACK and NACK protocols provide reliability to the TCP/IP and other protocols. However, they add a significant amount of storage to the transmission units, especially since the transmission and after transmission queues are typically per flow (i.e. per source/destination pair).

Another protocol is an automatic repeat request (ARQ) where acknowledgements are sent but, if the transmitter does not receive an acknowledgement within a given time frame, the transmitter automatically retransmits the packet.

SUMMARY OF THE PRESENT INVENTION

There is provided, in accordance with a preferred embodiment of the present invention, a network device including a receiver to receive a transmission from a source device and a transmitter at least to transmit a return signal to the source device indicating successful receipt or lack thereof of the transmission during a return period forming part of an inter-frame period after the transmission.

Moreover, in accordance with a preferred embodiment of the present invention, the transmitter also includes a transmission buffer to store packets to be transmitted to other devices and the receiver also includes a return signal unit. The return signal unit indicates to the transmission buffer to flush a current packet if a received return signal indicates receipt and to retransmit the current packet if the received return signal indicates lack of receipt.

Furthermore, in accordance with a preferred embodiment of the present invention, the return period includes a receipt period and/or a no-receipt period.

Still further, in accordance with a preferred embodiment of the present invention, the receiver includes a decoder to decode a receipt signal indication within a header of each the packet. The receipt signal indication indicates at least whether or not a receipt indication is requested and the decoder, in response, indicates to the transmitter to transmit, or not, the receipt indication.

Moreover, in accordance with a preferred embodiment of the present invention, the receipt signal indication also includes an indication of the type of receipt indication and/or the type of data to be transferred in the receipt signal.

In accordance with a preferred embodiment of the present invention, the network device is a synchronous device. Alternatively or in addition, in accordance with a preferred embodiment of the present invention, the network device is operative in the presence of asynchronous devices for which the length of an inter-frame gap is defined as the length of an inter-frame gap plus the length of the return period.

Further, in accordance with a preferred embodiment of the present invention, the transmission buffer stores frames for broadcast transmission and the return signal unit includes a unit to flush the current packet if there are no received return signals from devices receiving the broadcast transmission indicating lack of receipt.

Still further, in accordance with a preferred embodiment of the present invention, the frame is a multiple packet frame and the return signals indicate lack of receipt if any packets within the multiple packet frame are not correctly received.

There is also provided, in accordance with a preferred embodiment of the present invention, a method including receiving a transmission from a source device and transmitting a return signal to the source device indicating successful receipt or lack thereof of the transmission during a return period forming part of an inter-frame period after the transmission.

Moreover, in accordance with a preferred embodiment of the present invention, the transmitting also includes storing packets to be transmitted to other devices in a transmission buffer and the receiving also includes indicating to the transmission buffer to flush a current packet if a received return signal is positive and retransmitting the current packet if the return signal is negative.

Further, in accordance with a preferred embodiment of the present invention, the transmitting includes decoding a receipt signal indication within a header of each the packet, where the receipt signal indication indicates at least whether or not a receipt indication is requested, and indicating whether or not to transmit the receipt indication.

Still further, in accordance with a preferred embodiment of the present invention, the transmission buffer stores frames for broadcast transmission and also including flushing the current packet if there are no received return signals from devices receiving the broadcast transmission indicating lack of receipt.

There is also provided, in accordance with a preferred embodiment of the present invention, a method including transmitting a next transmission after an inter-frame period after a previous transmission, wherein the inter-frame period is long enough to allow a return signal responding to the previous transmission.

Moreover, in accordance with a preferred embodiment of the present invention, the inter-frame period includes an inter-frame gap and a return period.

Further, in accordance with a preferred embodiment of the present invention, the return period is a receipt period and/or a no-receipt period.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
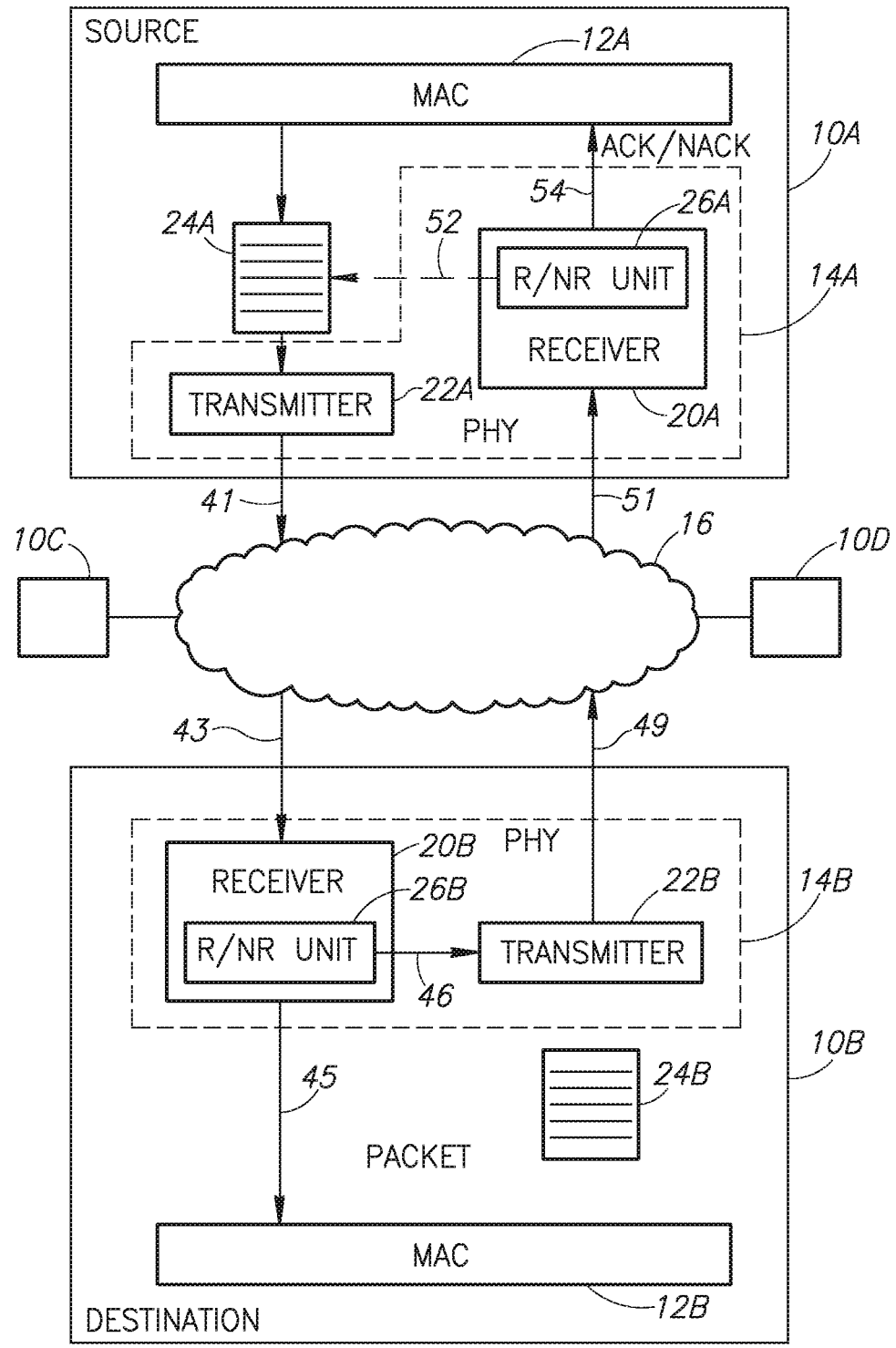
FIG. 1 is a schematic illustration of a plurality of network devices, constructed and operative in accordance with a preferred embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that the determination that a packet has been successfully received occurs during receipt and thus, is available very shortly after the transmission finishes. In accordance with a preferred embodiment of the present invention, the time between transmissions (which previously was just an inter-frame gap (IFG)) is increased slightly, becoming an inter-frame period, to allow a short "return" signal to be transmitted on the network. In accordance with a preferred embodiment of the present invention, the return signal generally is simpler than a packet, with little overhead, since the only device transmitting it is the destination device and the only device waiting for it is the source device.

Reference is now made to FIG. 1, which illustrates a plurality of network devices 10, constructed and operative in accordance with a preferred embodiment of the present invention. Each network device 10 may comprise at least two network elements, a media access control (MAC) unit 12 and a physical (PHY) device 14. MAC unit 12 may prepare packets of data for transmission and PHY device 14 may physically transmit them to, and receive them from, a network 16. Accordingly, PHY device 14 may comprise a receiver 20 and a transmitter 22. For clarity, FIG. 1 shows two devices, 10A and 10B, in full (with elements of device 10A labeled A and elements of device 10B labeled B) and two devices, 10C and 10D, as just boxes. All devices have the same elements.

In accordance with a preferred embodiment of the present invention, each network device 10 may comprise a transmission buffer 24, into which MACs 12 may place packets to be transmitted and from which PHYs 14 may transmit the oldest packet. However, in accordance with a preferred embodiment of the present invention, there may be no completed transmission buffer. Instead, each receiver 20 may comprise a receive/no-receive (R/NR) unit 26. As described hereinbelow, the R/NR unit 26 of the destination device may indicate that a transmission was received, or not, and the R/NR unit 26 of the source device may determine if a receipt return signal was transmitted from the destination device. If the R/NR unit 26 of the source device determines that its most recent transmission was properly received, it may indicate to its transmitter 22 to transmit the next packet from transmission buffer 24. Otherwise, it may indicate to its transmitter 22 to retransmit the packet previously transmitted. The packet may remain in transmission buffer 24 until it has been successfully transmitted or until its timing has run out. The retransmission generally occurs at the next time that the source device has access to network 16.

It will be appreciated that, in the present invention, acknowledgement of successful receipt may be relatively quick, such that there is no need to store packets for retransmission. Packets may remain in transmission buffers 24 until successfully transmitted.

It will further be appreciated that receivers 20 may respond to any type of transmission, whether they are full or partial packets, of a fixed or a variable size.

Figure 2:
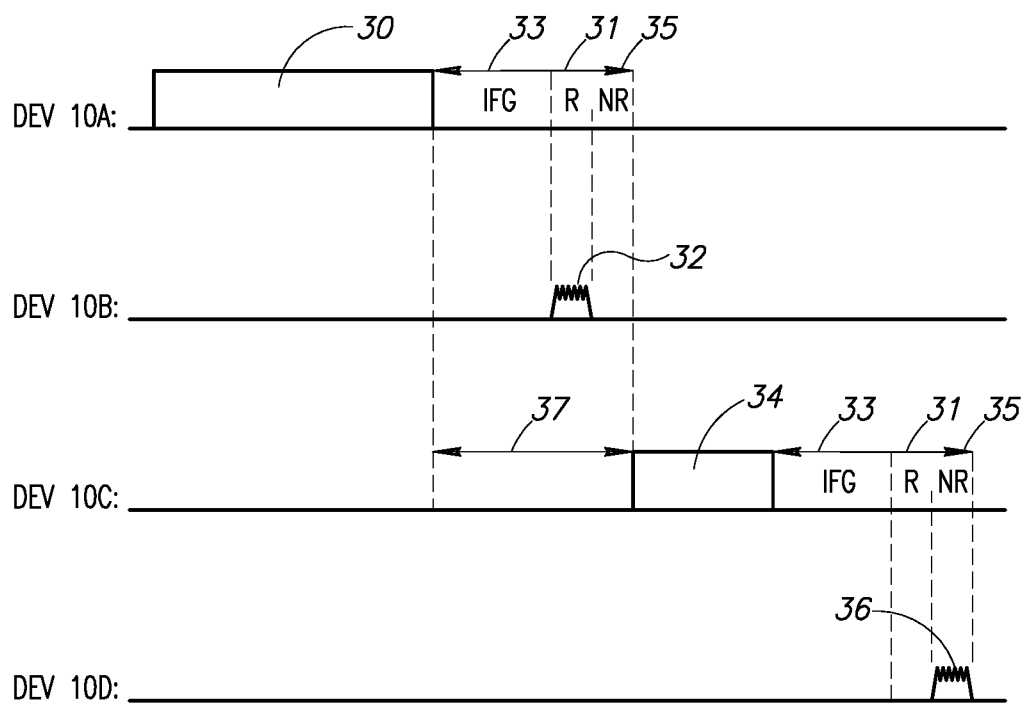
FIG. 2 is a set of transmission diagrams for the devices of the network of FIG. 1.

FIG. 1 illustrates the operation of the present invention for an exemplary transmission from device 10A (the source device) to device 10B (the destination device). FIG. 2, to which reference is also made, illustrates an exemplary transmission from device 10A to device 10B followed by an exemplary transmission from device 10C to device 10D. Each line in FIG. 2 is a transmission diagram for a different device.

MAC 12A (of source device 10A) may provide packets for transmission to transmission buffer 24A. Transmitter 22A may transmit a first packet onto network 16 (arrow 41). This transmission is shown in FIG. 2 as transmission 30.

Receiver 20B (of destination device 10B) may begin receiving (arrow 43) transmission 30 shortly after transmission 30 begins and may decode the transmission. The decoding may involve translating the transmitted signal to symbols, checking an error correction code, de-interleaving, and other operations on the transmitted signal to determine whether or not it was properly received. If it was properly received, receiver 20B may provide (arrow 45) the packet to MAC 12B and may indicate to R/NR unit 26B to instruct (arrow 46) transmitter 22B to transmit (arrow 49) a receipt return signal on network 16, during a receipt period 31 after the inter-frame gap (IFG), labeled 33. FIG. 2 shows transmission 30 on the transmission diagram for device 10A and a receipt signal, labeled 32, on the transmission diagram for device 10B, after inter-frame gap 33. FIG. 2 also shows a "no-receipt" period 35, useful for when a packet is not properly received.

Receipt signal 32 may be any suitable signal and may or may not contain data therein. For example, receipt signal 32 may be just a signal, or it may have a short preamble and a few bits or a byte of data. The data might include just an indication of the device transmitting it (in this example, device 10B). It might also have a bit value indicating receipt.

FIG. 2 shows an additional transmission, labeled 34, between device 10C and device 10D. Device 10C waited the full inter-frame period 37 (which, in this embodiment, includes inter-frame gap 33 followed by periods 31 and 35) after transmission 30 before transmitting transmission 34. For this example, device 10D did not successfully receive transmission 34. In one exemplary embodiment, device 10D transmits a no receipt signal 36 during no-receipt period 35 which may form part of the inter-frame period 37. For example, receipt period 31 may be after IFG 33 and no-receipt period 35 may be after receipt period 31 or vice versa.

Receipt signal 32 and no receipt signal 36 may be similar; the difference between them may stem only from the time at which they are transmitted. Alternatively, they might carry a bit indicating receipt or lack thereof. In a further alternative embodiment, there may be only one type of extra transmission, which may be defined as receipt signal 32 or no-receipt signal 36 as desired. Or, there may be two types of extra transmissions, as shown.

In an exemplary embodiment, IFG 33 may be 29 μs long and receipt signal 32 and no-receipt signal 36 might each be 10 μs long. Thus, as long as receiver 20B can finish decoding transmission 30 within 29 μs after the end of transmission 30, transmitter 22B can transmit either receipt signal 32 or no-receipt signal 36. Moreover, the addition of 10 μs (for one return period) or 20 μs (for two return periods) to the inter-frame time is not excessive. This additional time enables receipt or lack thereof to be determined quickly and thus, removes the need for retransmission buffers, a large savings. It will be appreciated that the present invention incorporates inter-frame periods 37 which may be shorter or longer than the exemplary values provided herein.

Returning to FIG. 1, after transmitter 22A finishes transmitting transmission 30, receiver 20A may wait inter-frame gap 33 after which receiver 20A may listen (arrow 51) for a return signal. If receiver 20A receives one, such as receipt signal 32, during receipt period 31, receiver 20A may have R/NR unit 26A indicate (dashed arrow 52) to transmission buffer 24A to flush the current packet. R/NR unit 26A may also acknowledge (arrow 54) to MAC unit 12A the successful transmission of the current packet.

If, on the other hand, receiver 20A receives a signal during no-receipt period 35, receiver 20A may have R/NR unit 26A indicate to transmission buffer 24A to retransmit the current packet. R/NR unit 26A may inform MAC unit 12A of the need to retransmit the current packet or may only indicate to MAC unit 12A once the transmission is successfully completed.

It will be appreciated that receipt period 31 and no-receipt period 35 may be after inter-frame gap 33. There may be one or both periods and they may be in the order shown here or in the opposite order. The order may be decided prior to activating network 16 or it may be changed periodically. For the latter, the order may be communicated to network devices 10 in a media access plan (MAP) or as part of individual frame headers.

It will also be appreciated that the present invention may be implemented in synchronous or asynchronous networks. For asynchronous networks, the between transmission gap may be extended to be longer than the IFG time. For synchronous networks, the media access plan, listing allocations known as "timeslots", of transmission times to the various network devices, may include receipt slots and/or no-receipt slots after each IFG.

It will also be appreciated that the type of return signal may be determined according to the type of traffic. Thus, for unicast traffic, a receipt signal may be required while for broadcast traffic, a no-receipt signal may be more efficient.

Figure 3:
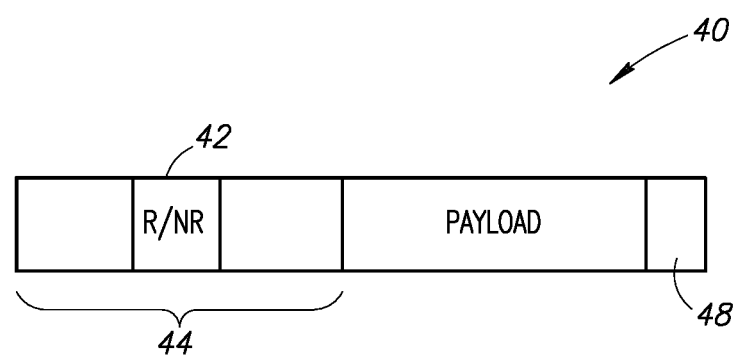
FIG. 3 is a schematic of an exemplary packet format.

In a further embodiment of the present invention, shown in FIG. 3 to which reference is now made, transmitter 22A (FIG. 1) may include in the packet 40 being transmitted, an indication 42 of whether or not a return signal is requested and of what type (receipt or no-receipt) of return signal it is.

Packet 40 may comprise a header 44, a payload 46 (comprising the data to be transmitted) and an optional footer 48. Typically, indication 42 may be one field within header 44.

If indication 42 denotes that a return signal is requested, then transmitter 22B (FIG. 1) may transmit the return signal (whether receipt signal 32 or no-receipt signal 36) (FIG. 2). Otherwise, it does not transmit anything and transmitter 22A may remove packet 40 from transmission buffer 24A directly after transmission.

Packet 40 may be useful for networks whose channel quality varies. When the channel quality is high and most packets are properly received, then there may be less need for a return signal of any kind, and throughput may be increased by not utilizing them, and by reducing the inter-frame period to just the IFG. However, when the channel quality is poor, retransmission may be required, throughput is less important, and thus, there may be need for a return signal.

Figure 4:
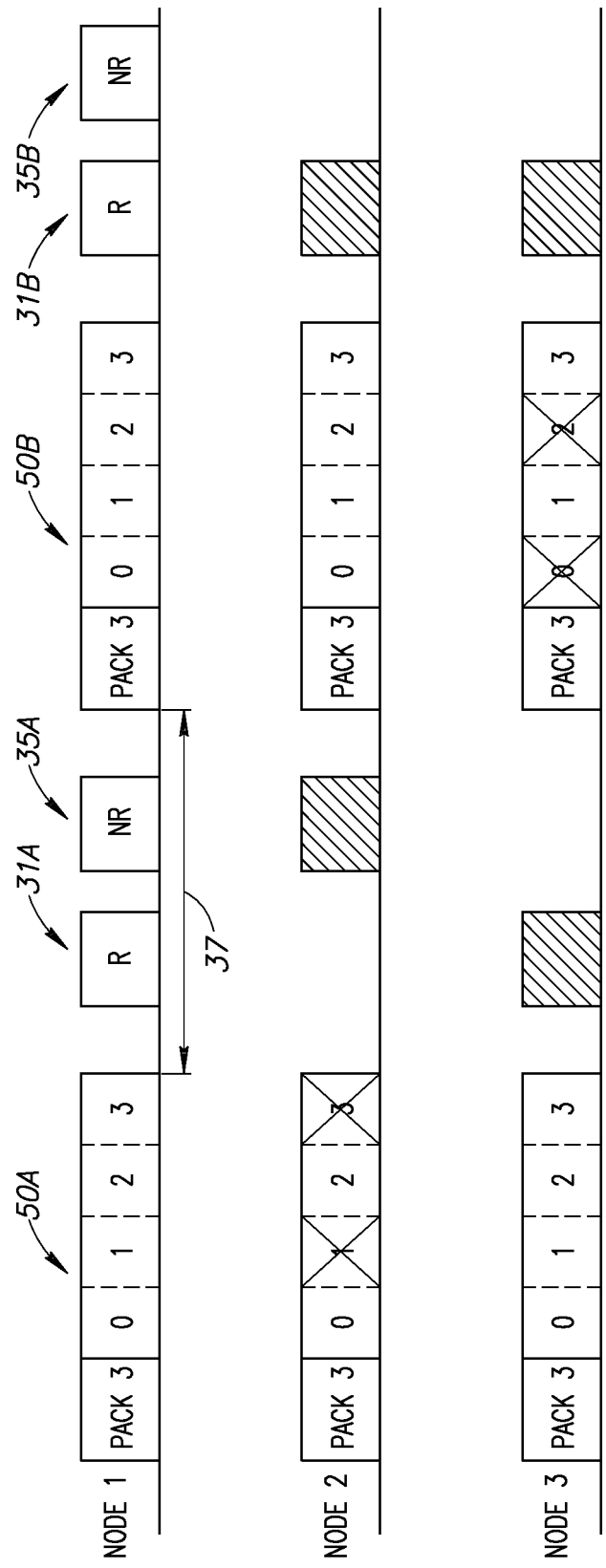
FIG. 4 is a set of transmission diagrams for the devices of the network of FIG. 1 during broadcast transmissions.

It will be appreciated that each node 10 (FIG. 1) in the network may decode at least header 44 of each packet and thus, may determine if a return signal is requested or not. Accordingly, each node may determine the expected length of inter-frame period 37 from the receipt signal indication information. FIG. 2 shows return periods 31 and 35 directly after IFG 33. It will be appreciated that the three periods may be separated, as shown in FIG. 4, to which reference is now made. Thus, the expected length of inter-frame period 37 may include gaps between periods 31, 33 and 35. The format of inter-frame period 37 may be preset when the network is initially set up.

In an alternative embodiment of the present invention, shown in FIG. 4 to which reference is now made, the present invention may be utilized for multicast or broadcast transmissions. FIG. 4 also shows multiple-packet multicast frames.

In FIG. 4, three nodes, or devices, are shown, where node 1 transmits the multicast frames 50 and nodes 2 and 3 attempt to receive them. Frames 50 may be multiple-packet frames, where, in FIG. 4, each multiple-packet frame 50 aggregates 4 packets, labeled 0, 1, 2 and 3. It will be appreciated that the present invention incorporates multiple-packet frame aggregating other amounts of packets.

Each receiver (i.e. nodes 2 and 3) may signal during receipt slot 31 if it received the entire frame correctly, and may signal during no-receipt period 35 if any of the packets within frame 50 were not received correctly. If transmitter 22 detects a signal only during receipt period 31, then it may determine that all intended receivers received the entire frame 50. However, if it detects a signal during no-receipt period 35 (whether from one or more receivers), it may resend the frame to all receivers.

For example, in FIG. 4, when frame 50 was transmitted for a first time, labeled 50A, its packets 1 and 3 were not received correctly by node 2 while node 3 received the entire frame correctly. Hence, node 3 signals during receipt period 31A while node 2 signals during no-receipt period 35A. The transmitter, node 1, detects a signal during no-receipt period 35A and thus, retransmits the entire frame again, as frame 50B.

This time, node 2 received all packets correctly and thus, signals during receipt period 31B. Node 3 only received packets 1 and 3 correctly. However, it may signal during receipt period 31B because it already has packet 0 and 2 from the previous frame, frame 50A. Thus, for frame 50B, node 1 detects only a signal in receipt period 31B, and may proceed to the next frame.

Unless specifically stated otherwise, as apparent from the previous discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A network device comprising:
   a receiver on a target device to receive a transmission from a source device;
   a transmitter at least to transmit a return signal to said source device during at least one return period forming part of an inter-frame period after said transmission, said inter-frame period having an inter-frame gap and each said at least one return period being not longer than said inter-frame gap; and
   a R/NR (received/not received) unit to instruct said transmitter to transmit said return signal during one said return period to indicate a return type for said return signal, wherein said return type is indicated as one of received and non received on said target device by said return period in which said return signal is transmitted.

2. The network device according to claim 1 and wherein said transmitter also comprises a transmission buffer to store packets to be transmitted to other devices and wherein said receiver also comprises a return signal unit to indicate to said transmission buffer to flush a current packet if a received return signal indicates receipt and to retransmit said current packet if said received return signal indicates lack of receipt.

3. The network device according to claim 1 and wherein said at least one return period is one of the following types of periods: a receipt period and a no-receipt period.

4. The network device according to claim 1 and wherein said at least one return period is two periods, one for receipt and one for no-receipt.

5. The network device according to claim 1 and wherein said receiver comprises a decoder to decode a receipt signal indication within a header of each said transmission, said receipt signal indication indicating at least whether or not a receipt indication is requested, said decoder indicating to said transmitter to transmit, or not, said receipt indication.

6. The network device according to claim 5 and wherein said receipt signal indication also includes an indication of a type of receipt indication requested.

7. The network device according to claim 1 and wherein said return signal comprises a byte of data.

8. The network device according to claim 1 and wherein said network device is a synchronous device.

9. The network device according to claim 1 and operative in the presence of asynchronous devices for which the length of an inter-frame gap is defined as the length of an inter-frame gap plus the length of said at least one return period.

10. The network device according to claim 2 and wherein said transmission buffer stores frames for broadcast transmission and said return signal unit comprises means to flush said current packet if there are no received return signals from devices receiving said broadcast transmission indicating lack of receipt.

11. The network device according to claim 10 wherein said frame is a multiple packet frame and wherein said return signals indicate lack of receipt if any packets within said multiple packet frame are not correctly received.

12. A method comprising:
   receiving on a target device a transmission from a source device;
   determining an appropriate return period within an inter-frame period associated with said transmission, wherein transmitting a return signal during said return period indicates that said transmission was one of received and non received on said target device, and wherein said inter-frame period has an inter-frame gap and each said appropriate return period is not longer than said inter-frame gap; and
   transmitting a return signal to said source device during said determined return period.

13. The method according to claim 12 wherein said transmitting also comprises storing packets to be transmitted to other devices in a transmission buffer and wherein said receiving also comprises indicating to said transmission buffer to flush a current packet if a received return signal is positive and retransmitting said current packet if said return signal is negative.

14. The method according to claim 12 and wherein said at least one return period is one of the following types of periods: a receipt period and a no-receipt period.

15. The method according to claim 12 and wherein said at least one return period is two periods, one for receipt and one for no-receipt.

16. The method according to claim 12 and wherein said transmitting comprises decoding a receipt signal indication within a header of each said transmission, said receipt signal indication indicating at least whether or not a receipt indication is requested, and indicating whether or not to transmit said receipt indication.

17. The method according to claim 16 and wherein said receipt signal indication also includes an indication of a type of receipt indication requested.

18. The method according to claim 12 and wherein said return signal comprises a byte of data.

19. The method according to claim 13 and wherein said transmission buffer stores frames for broadcast transmission and also comprising flushing said current packet if there are no received return signals from devices receiving said broadcast transmission indicating lack of receipt.

20. The method according to claim 19 wherein said frame is a multiple packet frame and wherein said return signals indicate lack of receipt if any packets within said multiple packet frame are not correctly received.

21. A network device comprising:
   a transmitter on a source device to transmit a transmission of at least one transmission frame to at least one target device;
   a transmission buffer to store a copy of said transmission;
   a receiver to listen for at least one return signal to be received from said at least one target device during at least one return period of an inter-frame period associated with a completion of said transmission, said inter-frame period having an inter-frame gap and each said return period being not longer than said inter-frame gap, wherein a return type for said return signal is indicated as one of received and non received in accordance with said return period in which said return signal is received; and
   a R/NR unit to instruct said transmission buffer to process said stored copy according said return type.

22. The network device according to claim 21 and wherein said R/NR comprises means for indicating to said transmission buffer to flush a current packet if a received return signal indicates receipt and to retransmit said current packet if said received return signal indicates lack of receipt.

23. The network device according to claim 21 and wherein said at least one return period is two periods, one for receipt and one for no-receipt.

24. The network device according to claim 21 and wherein said receiver comprises a decoder to decode a receipt signal indication within a header of each said transmission, said receipt signal indication indicating at least whether or not a receipt indication is requested, said decoder indicating to said transmitter to transmit, or not, said receipt indication.

25. The network device according to claim 24 and wherein said receipt signal indication also includes an indication of a type of receipt indication requested.

26. The network device according to claim 21 and wherein said return signal comprises a byte of data.

27. The network device according to claim 21 and wherein said network device is a synchronous device.

28. The network device according to claim 21 and operative in the presence of asynchronous devices for which the length of an inter-frame gap is defined as a length of an inter-frame gap plus a length of said at least one return period.

29. The network device according to claim 22 and wherein said transmission buffer stores frames for broadcast transmission and said return signal unit comprises means to flush said current packet if there are no received return signals from devices receiving said broadcast transmission indicating lack of receipt.

30. The network device according to claim 29 wherein said frame is a multiple packet frame and wherein said return signals indicate lack of receipt if any packets within said multiple packet frame are not correctly received.

31. A method comprising:
   on a source device, transmitting a transmission of at least one transmission frame to at least one target device;
   storing a copy of said transmission in a transmission buffer;
   listening for a return signal during at least one return period of an inter-frame period associated with a completion of said transmission, wherein said return period in which said return signal is received indicates its return type as one of received and non received, and wherein said inter-frame period has an inter-frame gap and each said return period is not longer than said inter-frame gap; and
   instructing said transmission buffer to process said stored copy according to said return type.

32. The method according to claim 31 and wherein said return signal is at least two said return signals transmitted in a same said return period by multiple said target devices.

33. The network device according to claim 1 and wherein said return type is indicated by said return period in which it is transmitted, without regard to contents of said return signal.

34. The method according to claim 12 and wherein a return type for said return signal is indicated by said return period in which it is transmitted, without regard to contents of said return signal.

35. The network device according to claim 21 and wherein said return type is indicated by said return period in which it is transmitted, without regard to contents of said return signal.

36. The method according to claim 31 and wherein a return type for said return signal is indicated by said return period in which it is transmitted, without regard to contents of said return signal.

* * * * *

UNITED STATES PATENT AND TRADEMARK OFFICE
CERTIFICATE OF CORRECTION

PATENT NO. : 8,559,365 B2  
APPLICATION NO. : 12/245859  
DATED : October 15, 2013  
INVENTOR(S) : Rozen et al.

Page 1 of 1

It is certified that error appears in the above-identified patent and that said Letters Patent is hereby corrected as shown below:

On the title page item [73] "CopperGate Communications Ltd., Tel Aviv (IL)"

should be replaced with -- SIGMA DESIGNS ISRAEL S.D.I. LTD., Tel Aviv (IL) --

Signed and Sealed this  
Eighth Day of April, 2014

Michelle K. Lee  
*Deputy Director of the United States Patent and Trademark Office*